(12) United States Patent
Chang et al.

(10) Patent No.: US 6,707,199 B2
(45) Date of Patent: Mar. 16, 2004

(54) BRUSHLESS DIRECT CURRENT FAN

(75) Inventors: Chin-Hung Chang, Tu-Chen (TW); Yu-Cheng Chou, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/198,413

(22) Filed: Jul. 17, 2002

(65) Prior Publication Data

US 2003/0222522 A1 Dec. 4, 2003

(51) Int. Cl.[7] .................................................. H02K 5/16
(52) U.S. Cl. ................................. 310/90; 310/89
(58) Field of Search ........................ 310/90, 67 R, 310/88, 89, 62; 384/902; 417/423.12, 178

(56) References Cited

U.S. PATENT DOCUMENTS

| | | | | |
|---|---|---|---|---|
| 4,130,770 A | * | 12/1978 | Wrobel | 310/67 R |
| 5,264,748 A | * | 11/1993 | Ootsuka et al. | 310/90 |
| 6,010,318 A | * | 1/2000 | Li | 417/423.13 |
| 6,318,976 B1 | * | 11/2001 | Hsieh | 417/423.12 |
| 6,376,946 B1 | * | 4/2002 | Lee | 310/67 R |

* cited by examiner

Primary Examiner—Thanh Lam
(74) Attorney, Agent, or Firm—Wei Te Chung

(57) ABSTRACT

A fan includes a frame (10), a stator (22), an impeller (40), and an oil retainer (70). The frame includes a sleeve (14) having a bearing (20) secured therein. The stator surrounds the sleeve, and the impeller surrounds the stator. The impeller includes inner and outer rings (46, 45). The oil retainer includes a large cylinder (72) fittingly received between the rings to form a seal between the large cylinder and the outer ring, and a small cylinder (74) received in the stator. A sealed chamber (49) is thus defined between the large cylinder and the impeller. A shaft (48) is fixedly secured in the impeller, and extends through the oil retainer and the bearing. A gap (50) is defined between the shaft and the small cylinder. In operation, lubricating oil originating from the bearing passes through the gap to the sealed chamber, and flows back to the bearing.

17 Claims, 3 Drawing Sheets

BRUSHLESS DIRECT CURRENT FAN

BACKGROUND OF THE INVENTION

1. Field of the Invention

The present invention relates to electrical fans, and particularly to rotary fans which have bearings with good lubricating characteristics.

2. Prior Art

Many computer electronic devices such as central processing units (CPUs) generate a lot of heat during normal operation. This can deteriorate their operational stability and damage associated electronic equipment. The heat must be removed efficiently to ensure normal operation. Fans are therefore often used to facilitate cooling of the CPU. Good performance of the fans mostly depends on performance characteristics of bearings used in the fans. Good lubricating qualities of the bearings increase the life-span of the bearings.

FIG. 3 shows a conventional fan 90. The fan 90 comprises a sleeve 94, a bearing 92 secured within the sleeve 94, and a shaft 98 rotatably extending through the bearing 92. The fan 90 further comprises an oil retaining ring 96 located above the bearing 94. There is a gap between a circumferential surface of the ring 96 and an inner circumference of a top end of the sleeve 94. In operation, lubricating oil originating from the bearing 94 passes out through the gap and is lost. Lubrication of the bearing 94 gradually diminishes. This shortens the life-span of the bearing 94.

Thus a fan having a bearing with an oil-tight seal is desired.

SUMMARY OF THE INVENTION

Accordingly, an object of the present invention is to provide a fan which has a bearing with good lubrication characteristics.

To achieve the above-mentioned object, a fan in accordance with the present invention comprises a frame, a stator, an impeller, and an oil retainer. The frame comprises a sleeve having a bearing secured therein. The stator surrounds the sleeve. The impeller is attached on the frame and surrounds the stator. The impeller comprises an inner ring, and an outer ring spaced from the inner ring. The oil retainer comprises a small cylinder received in the stator, and a large cylinder received in a space between the inner and outer rings. The outer ring and large cylinder cooperatively form a seal therebetween. A sealed chamber is thus defined between the large cylinder and the impeller. A shaft is fixedly secured in the impeller, and extends through the oil retainer and the bearing. A gap is defined between the shaft and the small cylinder. In operation, lubricating oil originating from the bearing passes through the gap to the sealed chamber, and flows back to the bearing. Lubrication of the bearing is thus consistently maintained.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
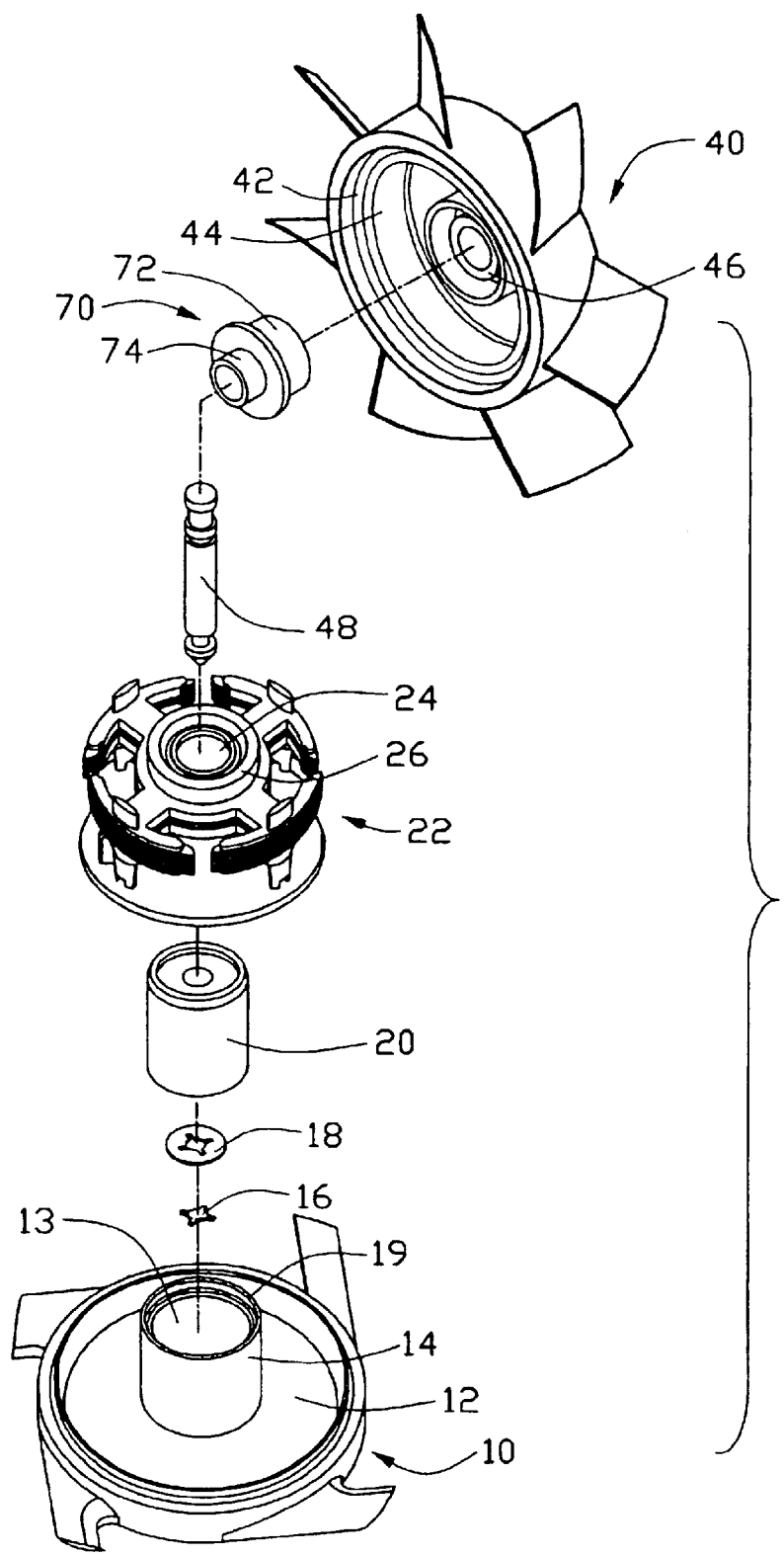
FIG. 1 is an exploded isometric view of a fan in accordance with the present invention.
Figure 2:
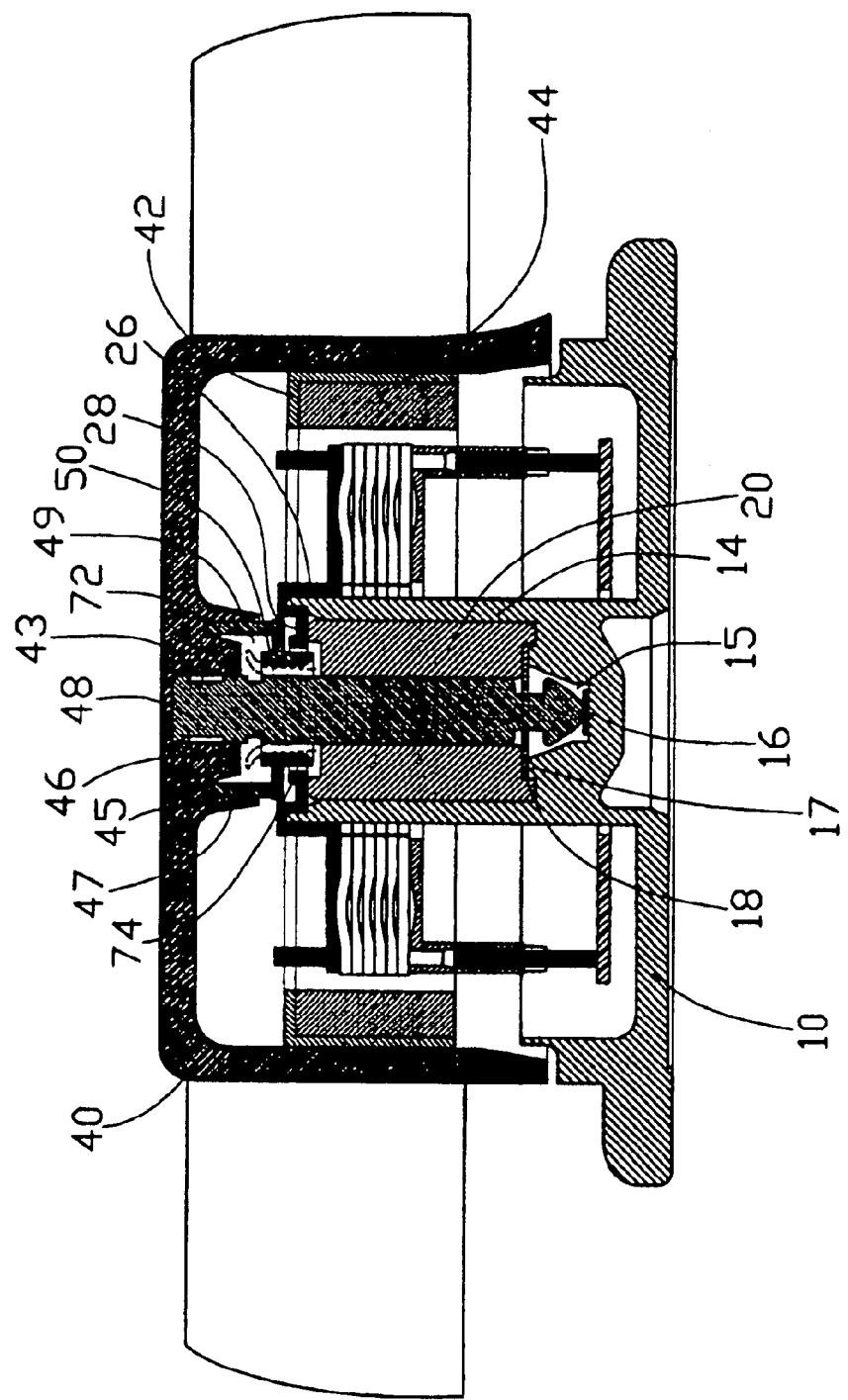
FIG. 2 is a cross-sectional view of the fan of FIG. 1 fully assembled.
Figure 3:
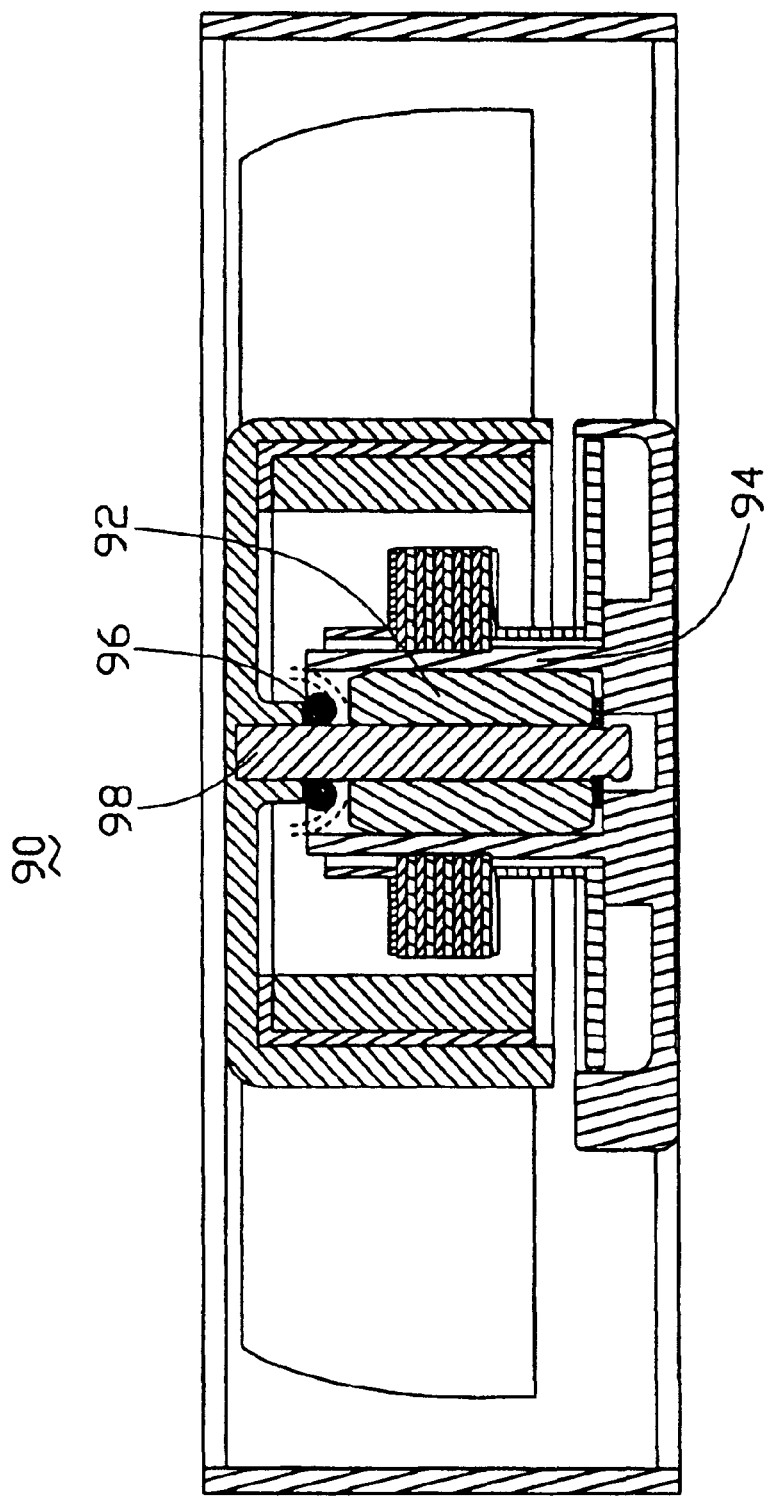
FIG. 3 is a cross-sectional view of a conventional fan.

Referring to FIGS. 1 and 2, a fan in accordance with a preferred embodiment of the present invention comprises a frame 10, a stator 22, an impeller 40, and an oil retainer 70.

The frame 10 comprises a circular base 12, a sleeve 14, an end washer 16, a locking washer 18, and a cylindrical bearing 20. The sleeve 14 extends upwardly from a center of the base 12, and defines a first hole 13 therein. A recess 15 is defined in a bottom portion of the sleeve 14, below and in communication with the first hole 13. An annular shoulder 17 is thereby formed around the recess 15. An annular first wall 19 is formed on a top end of the sleeve 14. An outer circumferential surface of the first wall 19 is flush with an outer circumferential surface of the sleeve 14, but a thickness of the first wall 19 is less than a corresponding thickness of sleeve 14. The end washer 16 is received in the recess 15. The locking washer 18 is received in the sleeve 14, and rests on the shoulder 17. The bearing 20 is received in the sleeve 14, and abuts the locking washer 18.

The stator 22 is attached on the frame 10 and surrounds the sleeve 14. The stator 22 defines a second hole 24 therethrough. An annular second wall 26 is formed on a top end of the stator 22, and surrounds the second hole 24. The second wall 26 has an inverted U-shaped cross-section, and fittingly receives the first wall 19 therein. An annular flange 28 extends radially inwardly from the second wall 26 toward a central axis of the second hole 24. The wall 28 abuts a top end of the bearing 20.

The impeller 40 is attached on the frame 10, and surrounds the stator 22. An annular magnetic conductive shell 42 is mounted in the impeller 40. An annular permanent magnet 44 is fixed in the shell 42. The impeller 40 comprises an outer ring 45 and an inner ring 46, both depending from a top plate thereof. The outer and inner rings 45, 46 are spaced from each other. A fixing bore 43 is defined in the inner ring 46. A shaft 48 is fixedly received in the fixing bore 43.

The oil retainer 70 comprises a large cylinder 72 and a small cylinder 74. The large cylinder 72 is received in the space between the inner and outer rings 46, 45 of the impeller 40. An outer circumferential surface of the large cylinder 72 fittingly abuts an inner circumferential surface of the outer ring 45. The outer ring 45 and large cylinder 72 thus cooperatively form a seal 47 therebetween. A sealed chamber 49 is thus defined between the large cylinder 72 and the impeller 40. The small cylinder 72 is inserted into the second hole 24 of the stator 22, and located above the bearing 20. The shaft 48 is extended through the oil retainer 70, the second hole 24 of the stator 22, the bearing 20 and the locking washer 18 to abut the end washer 16. An annular gap 50 is thus defined between the small cylinder 74 and the shaft 48.

In operation, the combined shaft 48 and impeller 40 rotate at high speed. Lubricating oil originating from a surface of the shaft 48 passes through the gap 50 to the sealed chamber 49. The lubricating oil then flows back to the bearing 20. No lubricating oil can leak out from the sealed chamber 49. Lubrication of the bearing 20 is consistently maintained.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A fan comprising:

a frame comprising a sleeve having a bearing secured therein;

a stator having a magnet surrounding the sleeve;

an impeller surrounding the stator;

an oil retainer attached to the impeller, a sealed chamber being defined between the oil retainer and the impeller; and a shaft fixedly attached below the impeller and extending through the oil retainer and the bearing, a gap being defined between the shaft and the oil retainer, wherein in operation of the fan, lubricating oil originating from the bearing passes through the gap to the sealed chamber and flows back to the bearing.

2. The fan as claimed in claim 1, wherein the impeller comprises an inner ring, and an outer ring spaced from the inner ring, and wherein the oil retainer comprises a first cylinder received in a space between the inner and outer rings, the first cylinder and the outer ring cooperatively forming a seal therebetween.

3. The fan as claimed in claim 1, wherein the oil retainer further comprises a second cylinder extending from the first cylinder and received in the stator, and the gap is defined between the shaft and the second cylinder.

4. The fan as claimed in claim 3, wherein the sleeve defines a first hole receiving the bearing therein, and the stator defines a second hole receiving the second cylinder therein.

5. The fan as claimed in claim 4, wherein the sleeve comprises a first wall at an inner end thereof, and the stator comprises an inverted U-shaped second wall receiving the first wall therein.

6. The fan as claimed in claim 5, wherein an outer circumferential surface of the first wall is flush with an outer circumferential surface of the sleeve, but a thickness of the first wall is less than a corresponding thickness of the sleeve.

7. The fan as claimed in claim 5, wherein the stator further has a flange extending radially from the second wall toward the second hole, and the flange is disposed on the bearing.

8. The fan as claimed in claim 4, wherein the sleeve comprises a recess defined in an end thereof distal from the impeller, the recess is in communication with the first hole, the sleeve further comprises a shoulder around the recess, an end washer is received in the recess, a locking washer is disposed on the shoulder, and the shaft extends through the oil retainer, the bearing, and the locking washer and abuts the end washer.

9. The fan as claimed in claim 1, wherein the bearing is a self-lubricating bearing.

10. A fan comprising:

a frame comprising a sleeve defining a first hole with a bearing secured therein;

a stator surrounding the sleeve and defining a second hole;

an impeller attached on the frame;

a shaft fixed in the impeller for rotating therewith, the shaft extending through the stator and the bearing; and an oil retainer connected between the impeller and the stator, the oil retainer comprising a large cylinder fittingly abutting the impeller to form a seal therebetween and a small cylinder received in the second hole of the stator and spaced from the shaft by a gap, the small cylinder disposed adjacent the bearing.

11. The fan as claimed in claim 10, wherein the impeller comprises an inner ring and an outer ring spaced from the inner ring, the large cylinder is received in a space between the inner and outer rings, and the seal is formed between the large cylinder and the outer ring.

12. The fan as claimed in claim 10, wherein the impeller defines a fixing bore in the inner ring and the shaft is fixed in the fixing bore.

13. The fan as claimed in claim 10, wherein the impeller has a magnetic conductive shell secured therein and a permanent magnet fixed on the shell, the shell and the permanent magnet surrounding the stator.

14. The fan as claimed in claim 10, wherein the sleeve comprises a recess in an end thereof distal from the impeller, the recess is in communication with the fist hole, the sleeve further comprises a shoulder around the recess, an end washer is received in the recess, a locking washer is disposed on the shoulder, and the shaft extends through the oil retainer, the bearing, and the locking washer and abuts the end washer.

15. A fan comprising:

a frame comprising a sleeve with a bearing received therein;

a stator having magnet surrounding the sleeve;

an annual wall defining a circular flange located above the upper portions of the sleeve and the bearing;

an impeller surrounding the stator;

an oil retainer attached to the impeller and one end thereof entered in the flange so as to cooperate with both the flange and the impeller to form a closed space thereof for preventing oil leaking; and a shaft fixedly attached to and below said impeller and extending through said oil retainer and said bearing.

16. The fan as claimed in claim 15, wherein an joint portion of said oil retainer with the impeller is spaced from the shaft radially.

17. The fan as claimed in claim 15, wherein said flange includes portions extending both radially and axially.

* * * * *